April 28, 1925.
C. ORNBO
1,535,852
BISCUIT MAKING APPARATUS
Filed Nov. 22, 1924    2 Sheets-Sheet 1
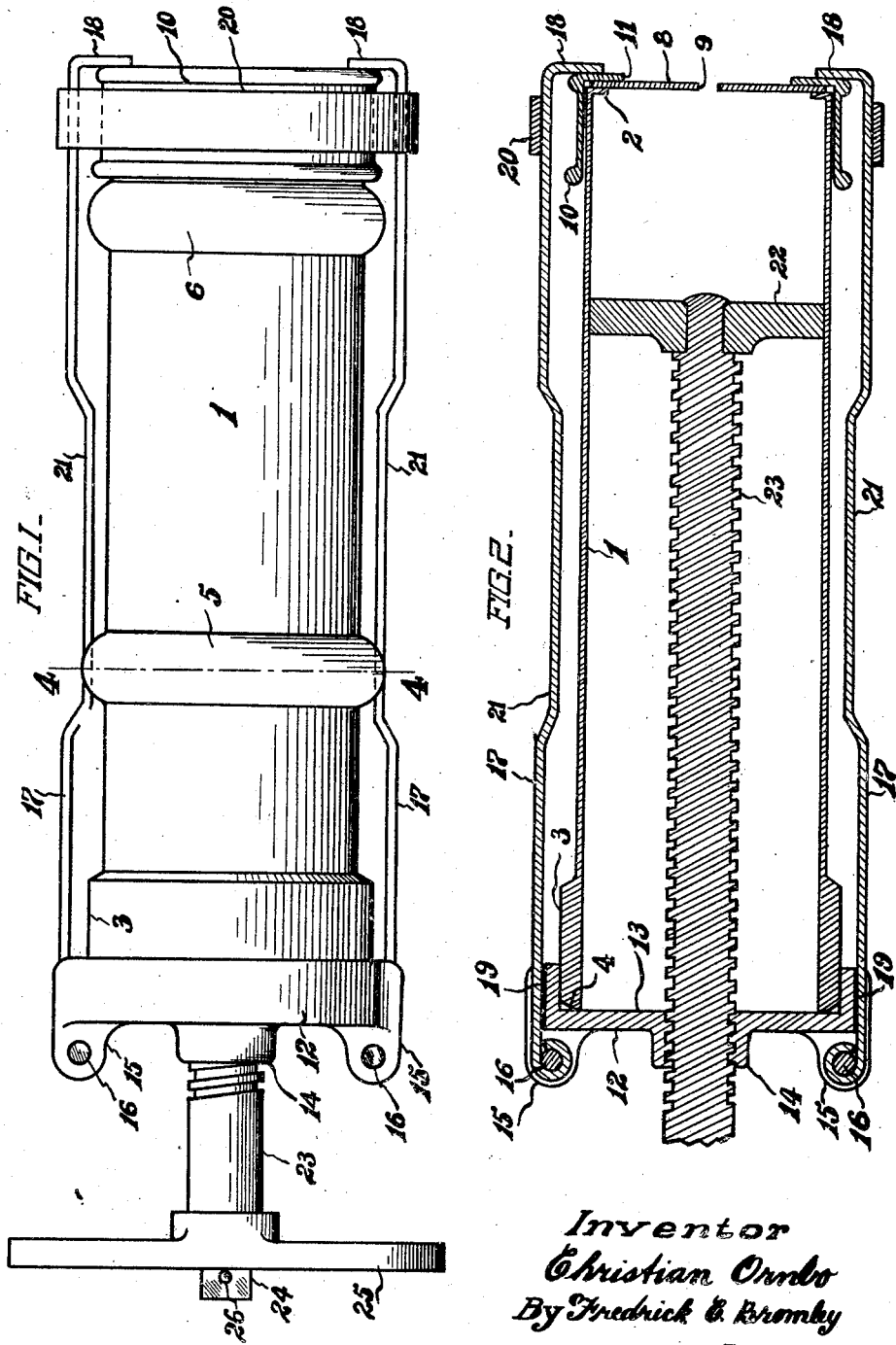
Inventor
Christian Ornbo
By Fredrick E. Bromby
Atty April 28, 1925. 1,535,852

C. ORNBO

BISCUIT MAKING APPARATUS

Filed Nov. 22, 1924 2 Sheets-Sheet 2

Inventor
Christian Ornbo
By Fredrick E. Bromley
Atty

Patented Apr. 28, 1925.

1,535,852

UNITED STATES PATENT OFFICE.

CHRISTIAN ORNBO, OF TORONTO, ONTARIO, CANADA.

BISCUIT-MAKING APPARATUS.

Application filed November 22, 1924. Serial No. 751,656.

*To all whom it may concern:*

Be it known that I, CHRISTIAN ORNBO, a subject of the King of Denmark, resident of the city of Toronto, in the Province of Ontario, in the Dominion of Canada, have invented new and useful Improvements in Biscuit-Making Apparatus, of which the following is a specification.

The invention relates to improvements in biscuit making apparatus as described in the present specification and shown in the accompanying drawings that form part of the same.

The invention has for its object the provision of a new and useful device for bakeries whereby biscuits may be made in a variety of fancy shapes and forms. While this device is primarily intended for use in the manufacture of biscuits, it may also equally usefully be employed for the decorating of pies, cakes or other analogous purposes.

The invention consists essentially of a container or hollow cylinder of suitable capacity for holding the dough from which the biscuits are manufactured. One end of this container is provided with interchangeable mouthpieces which may be selectively employed, while its opposing end carries a manually operable piston by which the contents are forced through the mouth or orifice in order to form the biscuit as hereinafter described. This biscuit material or dough is expelled through the orifice in strips and subsequently sliced by hand in order to form the individual biscuits ready for baking.

Figure 3:
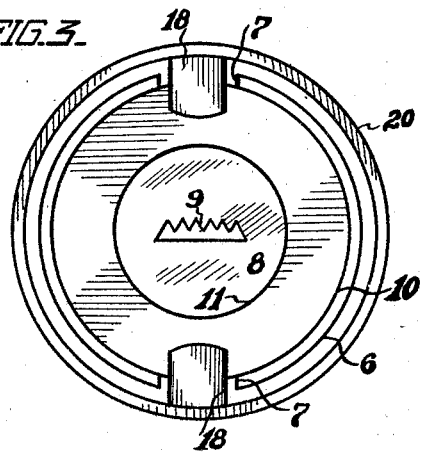
Figure 4:
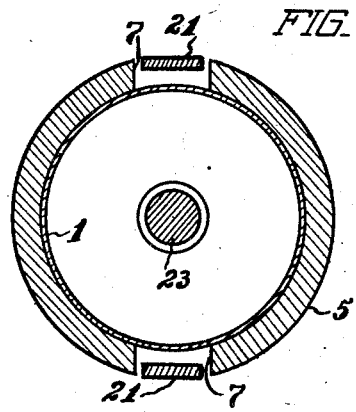
Figure 5:
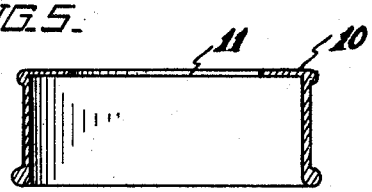
Figure 6:
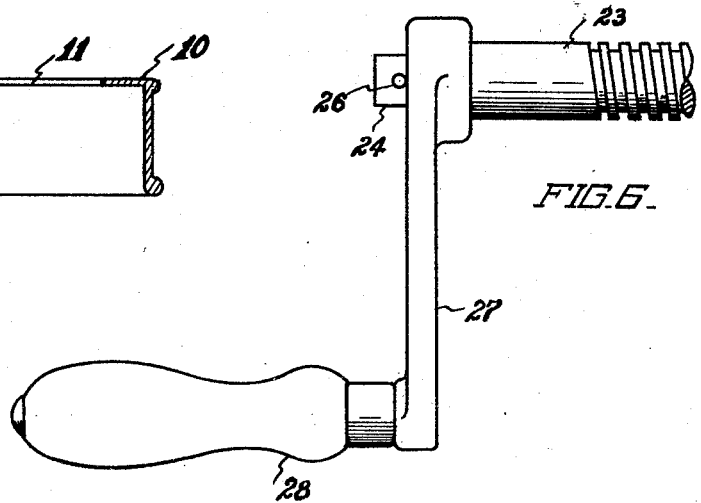
Figure 7:
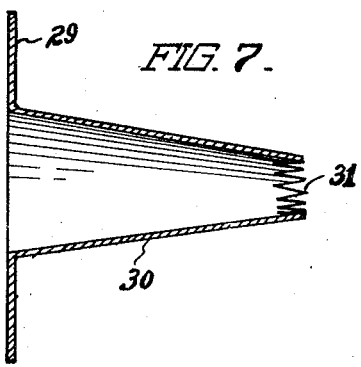

Referring to the drawings, Figure 1 is a longitudinal elevation of the invention. Figure 2 is a longitudinal sectional view of the invention, such section being taken through the centre. Figure 3 is a front end view of the device. Figure 4 is a transverse sectional view taken on the line 4—4 of Figure 1. Figure 5 is a central sectional view of the retainer for holding the mouthpieces to the container. Figure 6 is a detail view of a modified form of handle to that shown in Figure 1. Figure 7 is a modified form of mouthpiece for the container. Like numerals of reference indicate corresponding parts throughout each figure of the drawings.

In the drawings, 1 designates the container or hollow cylinder having its opposing ends open. The front end of this container is partially closed by an annular flange 2 while the other end is provided with a thickened portion 3 in order to substantially reinforce it at this end. The edge of this reinforced end is chamfered as at 4 so as to reduce the point of contact to a minimum and thus avoid interference with dough which may accumulate at this point and become hardened, as will become more apparent as the description proceeds. This container is further reinforced by a pair of interrupted ferrules 5 and 6 which are spaced apart at points intermediate of its length. The interruption is formed by cutting slots 7 on the diametrically opposite sides of the respective ferrules. The slots of one ferrule are positioned in alignment with those of the other, the object of which will be manifest as the description proceeds.

The mouthpieces comprise discoidal plates as at 8 which in position upon the device abut the flange 2 of the container. Each plate is provided with a central orifice 9, the orifice of these plates differing of course in accordance with the particular biscuit it is designed to produce: for example, for a biscuit of a star shape the orifice would necessarily take the shape of a star.

The selected plate upon being positioned against the front end of the container is held thereat by the retainer 10 which comprises a cup shaped member constructed to neatly fit over the front end of the container. This member is cut away as at 11 in order that it shall not obstruct the orifice of the plate 8.

12 is a head cut away as at 13 to receive the reinforced end 3 of the container. This head is provided with a centrally disposed boss 14 bored and internally screw threaded. On diametrically opposite sides of this boss lugs 15 are provided carrying pins 16 which form pivots. Connected to these pivots are comparatively long straps 17 of such length as to extend beyond the opposing end of the container with their free termini inflexed for the purpose of providing fingers 18 to grip the retainer 10 and thus secure the same together with the mouthpiece 8 to the container. These straps are so arranged that in their closed position they bear upon the periphery 19 of the head 12 which gives them a slight tendency to spread in order that upon placing a ring 20 over their free ends sufficient friction will be created to lock these straps about the container. These straps intermediate of their length are inwardly offset as at 21 so that they will fit into the slots 7 of the ferrule 5 and thus prevent relative twisting movement between the head and the container.

The slots of the other ferrule, 6, provide sufficient clearance for the straps in order that the latter may be bent inwardly when removing the locking ring 20.

Operably disposed within the container is a piston 22 and connected to this piston is a rod 23, the connection between the piston and rod being such that the rod is free to rotate within the piston. This rod extends longitudinally from the container and threadedly engages the boss 14 of the head 12, this rod being of such length that it protrudes a considerable distance beyond the container head. The extremity of this protruding portion is squared as at 24 to receive a double ended lever 25 which is provided with a square bore in order to prevent independent rotation between the two members. The retention of this lever is effected by a cotter-pin 26, although any other convenient means may of course be employed in this capacity.

Referring to Figure 6: the modified form of handle herein disclosed consists of a crank 27 likewise secured upon the extremity 24 of the rod 23 and provided with a loose handle 28.

Referring to Figure 7: this discloses a modified form of mouthpiece comprising a disc portion 29 having an integral funnel 30, the orifice of which is serrated as at 31.

In the use of this invention, assuming the device disassembled, the container 1 is first fitted with whichever of the mouthpieces 8 it is desired to employ, the retainer 10 is thereupon placed over such mouthpiece and the container with these parts in place as described placed in an upright position upon the table or other convenient support in order that it may be filled with the admixture of biscuit dough or other material. The operator then places the head 12 upon the container, having first fully retracted the piston 22. The straps 17 are then brought against the container so that their fingers 18 engage the retainer 10 as previously described, whereupon the locking ring 20 is slipped over these straps securely locking the assembled parts together.

Upon turning the lever 25 in a direction to advance the piston 22 within the container, the contents are forced through the orifice 9 of the mouthpiece in a continuous strip, the operator withdrawing gradually in order to permit the strip as it issues from the container to dispose itself in line upon the table, when it may be conveniently sliced to form the individual biscuits.

The modified form of handle shown in Figure 6 is used in place of the double ended lever 25 when rapid operation of the rod 23 is desired when the resistance to the piston is lowered on account of the admixture in the container being of a more flexible consistency.

The modified form of mouthpiece shown in Figure 7 is employed where it is desired to produce biscuit strips which cannot be obtained by the discoidal plates 8; however it is manifestly evident that quite within the spirit and scope of the invention these plates may be varied in their construction to meet the requirements which each specific biscuit demands.

What I claim is:—

1. In a device of the class described, an open ended cylinder, a flange forming an abutment at the front end thereof, a mouthpiece positioned against such abutment, said mouthpiece being provided with an orifice, a retainer securing said mouthpiece, means for detachably locking the retainer to the cylinder, a head fitted to the rear end of such cylinder, a piston, and means carried by the head for operating the piston within the cylinder in order to expel its contents through the orifice of the mouthpiece.

2. In a device of the class described, an open ended cylinder, a flange forming an abutment at the front end thereof, a mouthpiece positioned against such abutment, said mouthpiece being provided with an orifice, a retainer securing said mouthpiece, a head fitted to the rear end of the cylinder, means extending from said head to the retainer for detachably locking these parts to the cylinder, a piston, and means carried by the head for operating the piston within the cylinder in order to expel its contents through the orifice of the mouthpiece.

3. In a device of the class described, an open ended cylinder, a flange forming an abutment at the front end thereof, a mouthpiece positioned against such abutment, said mouthpiece being provided with an orifice, a cup-shaped retainer securing said mouthpiece to the cylinder, a head fitted to the rear end of the cylinder, straps pivoted to said head, fingers carried by the straps for engaging the retainer, a locking ring for encircling said straps and cylinder, a piston, and means carried by the head for operating the piston within the cylinder in order to expel its contents through the orifice of the mouthpiece.

4. In a device of the class described, an open ended cylinder, ferrules for reinforcing said cylinder, a flange forming an abutment at one of its ends, a mouthpiece positioned against such abutment, said mouthpiece being provided with an orifice, a head fitted to the other end of such cylinder, means for detachably securing the mouthpiece to the cylinder, a piston, and means carried by the head for operating the piston within the cylinder in order to expel its contents through the orifice of the mouthpiece.

5. In a device of the class described, an open ended cylinder, a flange forming an abutment at the front end thereof, a mouthpiece positioned against such abutment, said mouthpiece being provided with an orifice, a cup-shaped retainer securing said mouthpiece to the cylinder, a head fitted to the rear end of the cylinder straps pivoted to said head, fingers carried by the straps for engaging the retainer, a locking ring for encircling said straps and cylinder, a piston operably disposed within the cylinder, a rod connected to said piston, said rod protruding from and threadedly engaging the head, and means whereby the same may be rotated.

Signed at Toronto, Canada, this 17th day of November, 1924.

CHRISTIAN ORNBO.

Witnesses:
W. HUMPHREY MARSDEN,
F. C. BROMLEY.